(12) United States Patent
Uchida et al.

(10) Patent No.: US 6,805,925 B2
(45) Date of Patent: Oct. 19, 2004

(54) TRANSMITTABLE LIGHT-SCATTERING SHEETS

(75) Inventors: Tatsuo Uchida, 1-11, Takasago 2-chome, Miyagino-ku, Sendai-shi, Miyagi 983-0014 (JP); Hiroyuki Takemoto, Himeji (JP)

(73) Assignees: Daicel Chemical Industries, Ltd., Osaka (JP); Tatsuo Uchida, Miyagi (JP)

(*) Notice: Subject to any disclaimer, the term of this patent is extended or adjusted under 35 U.S.C. 154(b) by 303 days.

(21) Appl. No.: 09/910,921

(22) Filed: Jul. 24, 2001

(65) Prior Publication Data

US 2002/0012086 A1 Jan. 31, 2002

(30) Foreign Application Priority Data

Jul. 24, 2000 (JP) ........................... 2000-222566

(51) Int. Cl.[7] ............................................. G02F 1/1335
(52) U.S. Cl. .................... 428/1.3; 428/1.55; 428/147; 428/612; 252/582; 252/585; 349/112; 349/113; 349/64; 349/86; 362/558; 362/341; 359/576; 359/586
(58) Field of Search ................................ 428/1.3, 1.55, 428/147, 612; 252/582, 585; 349/112, 113, 64, 86; 362/341, 558; 359/569, 573, 574, 576, 586, 599

(56) References Cited

U.S. PATENT DOCUMENTS 4,938,568 A * 7/1990 Margerum et al. .......... 349/201
5,571,415 A * 11/1996 Clikeman et al. ........... 210/490
5,656,205 A * 8/1997 Rabolt et al. ................ 252/582
5,851,700 A * 12/1998 Honda et al. .................. 430/2
5,976,686 A * 11/1999 Kaytor et al. ............. 428/317.9
6,497,946 B1 * 12/2002 Kretman et al. ......... 428/317.9
6,573,958 B2 * 6/2003 Takahashi et al. ............ 349/86

FOREIGN PATENT DOCUMENTS

| JP | 618430 B | 3/1986 |
| JP | 63228887 A | 9/1988 |
| JP | 9-96705 A | 4/1997 |
| JP | 11-2706 A | 1/1999 |
| JP | WO 99/21913 A1 | 5/1999 |
| JP | 2000-187105 A | 7/2000 |
| JP | 2000-321568 A | 11/2000 |

* cited by examiner

Primary Examiner—Harold Pyon
Assistant Examiner—Sow-Fun Hon
(74) Attorney, Agent, or Firm—Birch, Stewart, Kolasch & Birch, LLP

(57) ABSTRACT

A transmittable light-scattering sheet (a transmitting type light-scattering sheet) of the present invention comprises a plurality of layers, each having a bicontinuous structure composed of a plurality of polymers. The layers differ from each other in average period size of the bicontinuous structure. The sheet may comprise, for example, a first layer having a bicontinuous structure (e.g., the average period size of the bicontinuous structure of 1.5 to 4 μm) and a second layer each having a bicontinuous structure (e.g., the larger average period size of the bicontinuous structure than that of the first layer by 0.5 to 8 μm). In the sheet, the first layer may be next to the second layer. The ratio of the period size of the first layer to that of the second layer may be the first layer/the second layer=1.3/1 to 4/1. Such a sheet can impart a directionality to a reflected light.

12 Claims, 4 Drawing Sheets

TRANSMITTABLE LIGHT-SCATTERING SHEETS

This application claims priority from Japanese Application No. 222566/2000, filed Jul. 24, 2000.

TECHNICAL FIELD

The present invention relates to a transmittable light-scattering sheet useful for brightening a display screen of a liquid crystal display device, and a liquid crystal display device using the sheet.

BACKGROUND ART

The liquid crystal display device is utilized in the display segments of, for example, personal computers, word processors, liquid crystal televisions, chronometers, desktop calculators. Recent years have witnessed advances in the construction of infrastructures for telecommunications systems and in the network consolidation of information through the computer-communications equipment integration, such as internets. By network consolidation of information, the access to information is freed from restrictions as to time and place. It is advantageous for a utilization of such networks that small-size telecommunication equipments, for example, portable information terminals such as PDA (personal digital assistance) which have recently been developed and further-downsized mobile personal computers (PC) of reduced thickness and weight compared to notebook-sized personal computers (PC) are utilized. Since portability is required of the portable information terminal and the mobile PC, it is necessary to reconcile the need for a longer battery operating time with the need for reduced thickness and downsizing of communications devices. Therefore, display devices for use in the portable information terminal and the mobile PC must be of reduced thickness, reduced weight and low power consumption. For attaining these requirements, the display mode which is considered to be most promising is a reflecting mode liquid crystal display device. Particularly, in order to keep abreast with the increasing versatility of data accompanying the ever-continuing advances in multimedia, there is a demand for reflecting-mode liquid crystal display devices not only capable of color display and high image-quality (high-definition) display but also of low production cost.

As the reflecting mode liquid crystal display device, there are known various kinds of devices. For color display and high image-quality (high-definition) display, a device utilizing one polarizer plate is advantageously employed. For example, the R-OCB mode in which the liquid crystal layer is of the HAN (Hybrid Aligned Nematic) alignment has excellent characteristics such as low voltage, wider viewing angle, high-speed response, middle color rendition and high contrast. In such a reflecting type liquid crystal display device, since an incident light (natural light, ambient light) on a front surface is efficiently introduced into the liquid crystal layer and is reflected with a light reflecting electrode on back side of the liquid crystal layer, and the reflected light is diffused so that the visibility is not deteriorated, such a device is required to exploit a natural or ambient light sufficiently.

As the reflecting type Liquid crystal display device, in Japanese Patent Application Laid-Open No. 228887/1988 (JP-63-228887A) and Photofabrication Symposium '92 sponsored by the Japanese Society of Printing, the fundamental technology about reflecting type liquid crystal display device, and the liquid crystal display device given an enlarged viewing angle of the display surface through the prevention of total reflection by means of adopting a surface-corrugated metal thin film as the lower electrode (back electrode) were introduced. Moreover, in lieu of such a manner with the diffusion reflector, there is also known a manner employing a transmittable light-scattering sheet (Japanese Patent Publication No. 8430/1981 (JP-61-8430B)).

In general, the proportion of loss of external light (reflected light) is large since a polarizer plate is employed in the reflecting type liquid crystal display. Particularly, in case of a color display device, the proportion of loss of external light (reflected light) is further increased since a color filter is used. Thus, a simple diffused light (e.g., a light diffused in a Gaussian distribution) cannot impart enough brightness to the display screen. In order to solve such problems, it is required that a diffused light is directed in a given direction (directed-type diffusion).

However, in case of directing a reflected light diffused by a diffusing-reflector, it is necessary to precisely control the shape and distribution of the surface irregularities of the reflector but this is a costly procedure.

Meanwhile, when the diffuse-reflected light is directed by utilizing a transmittable diffusing sheet, a method for imparting directionality to the diffuse-reflected light by means of a resin sheet as polymerized by utilizing holography is known (The synopsis of Lectures at Japanese Society of Liquid Crystal Science, 1998) but the production process is complicated and costly.

While, as a transmittable diffusing sheet obtainable at low production cost, there is known a transmittable diffusing sheet in a particle dispersion form having a droplet structure. However, in the sheet having the particle dispersion structure, the distribution of a diffuse light is close to the Gaussian distribution in principle. Thus, the diffused light can not be directed to an angle other than one in regular reflection and high brightness of the display image can not be realized.

The object of the present invention is, therefore, to provide a transmittable light-diffusing sheet capable of imparting directionality to a diffused light and a liquid crystal display device with the sheet.

It is a further object of the present invention to provide a transmittable light-diffusing sheet useful for enhancing the intensity of the diffused light over a broad angle range and a liquid crystal display device with the sheet.

DISCLOSURE OF INVENTION

The inventors of the present invention made intensive investigations to accomplish the above objects and found that the directionality can be imparted to a diffused light by forming a bicontinuous structure or an intermediate structure between the bicontinuous structure and a droplet structure inside a sheet which is obtained by phase separating a plurality of polymers owing to spinodal decomposition. The inventors of the present invention made further intensive investigations to accomplish the above objects and found that the directionality can be imparted to a diffused light with high intensity over a broad angle range, and the high brightness can be imparted to the whole display screen uniformly.

That is, a transmittable light-scattering sheet (a transmitting type light-scattering sheet) of the present invention comprises a plurality of layers, each having a bicontinuous structure composed of a plurality of polymers. The layers differ from each other in average period size of the bicontinuous structure. The sheet may comprise a first layer having a bicontinuous structure (e.g., the average period size of the bicontinuous structure of 1.5 to 4 μm) and a second layer each having a bicontinuous structure (e.g., the larger average period size of the bicontinuous structure than that of the first layer by 0.5 to 8 μm). The ratio of the period size of the first layer to that of the second layer may be the first layer/the second layer=1.3/1 to 4/1. In the sheet, the first layer may be next to the second layer. The ratio of the thickness of the first layer to that of the second layer may be the first layer/the second layer=1/1 to 10/1. The thickness of the sheet may be 3 to 300 μm. The haze value of the sheet may be 20 to 80%. The bicontinuous structure may be formed by spinodal decomposition of a composition containing a plurality of polymers. The diffused light is directed by using such a sheet. For example, a reflector is disposed on the first layer side and a light is incident on the second layer side, a reflected and diffused light (sometimes referred to simply as a reflected light), which is reflected by the reflector and diffused through or via the sheet, may have a peak of the reflected light at a diffusion angle of 5 to 10°, or may have a broad area of the reflected light over a diffusion angle of 10 to 15°. A plurality of polymers constituting the bicontinuous structure may comprise a styrenic resin and an acrylic resin. The bicontinuous structure may have a phase separation structure of a plurality of polymers.

The present invention also includes a liquid crystal display device wherein the above sheet is disposed on light path of the liquid crystal cell, and a process for producing the transmittable light-scattering sheet, which comprises laminating a plurality of previously molded sheets varying in an average period size.

As used in this specification, the term "sheet" means any two-dimensional product regardless of its thickness, thus inclusive of film.

The term "a bicontinuous structure" is used herein to include an intermediate structure between the bicontinuous structure and a droplet structure.

BEST MODE FOR CARRYING OUT THE INVENTION

[Transmitting Type Light-scattering Sheet]

Figure 1:
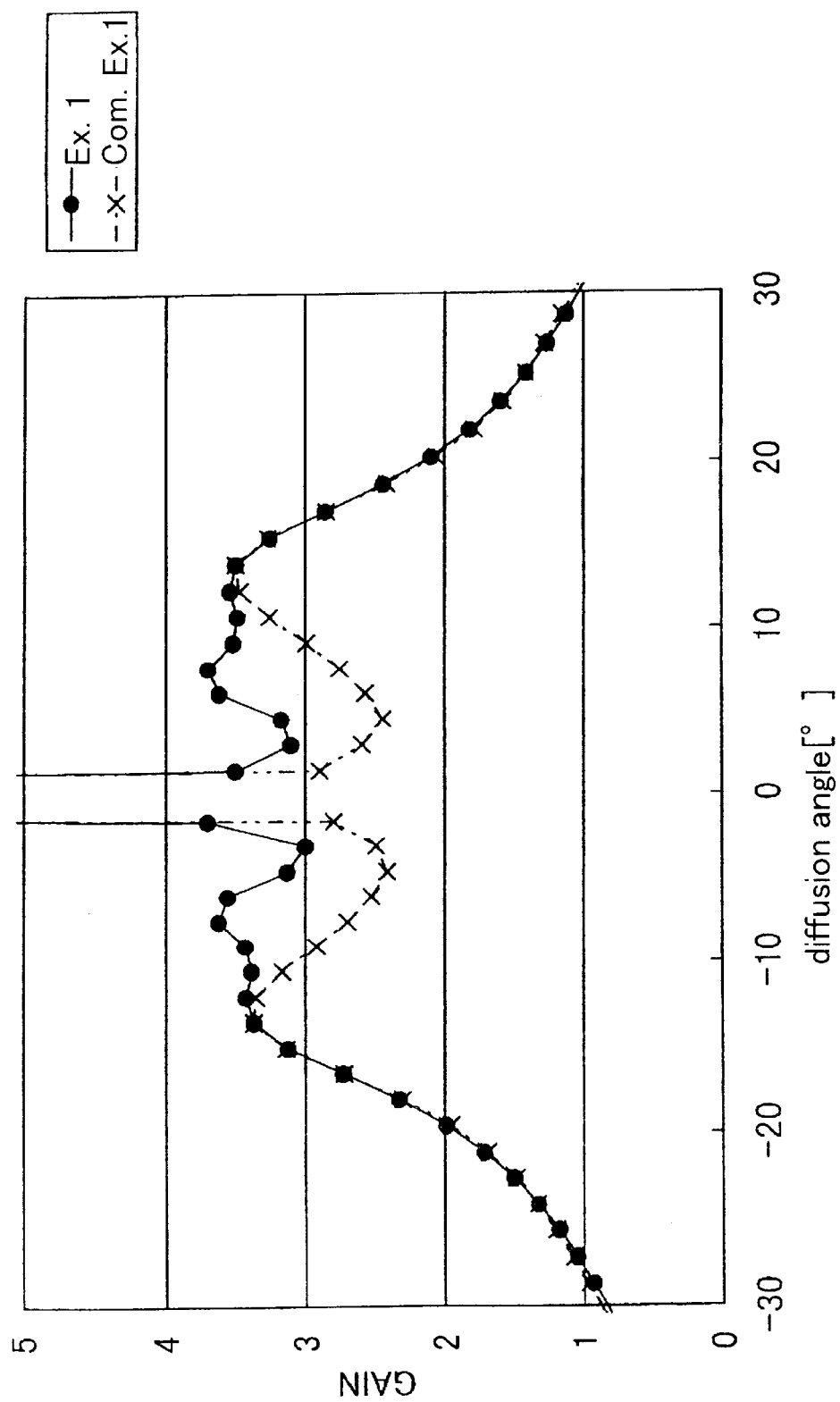
FIG. 1 is a graph showing the relationship between a diffusion angle and an intensity of a diffused light in the sheets of Example 1 and Comparative Example 1.

The transmittable light-scattering sheet (transmitting mode light-scattering) has a plurality of layers varying in period size (sometimes referred to as interphase distance) of a bicontinuous structure composed of a plurality of polymers differing from each other in refractive index. By employing such a sheet, an incident light can be diffused according to the difference in refractive index between the polymers forming the bicontinuousstructure. The differencein refractive index between polymers may be, for example, about 0.001 to 0.2, preferably about 0.01 to 0.15, and more preferably about 0.1 to 0.15.

A polymer having moldability and stability (e.g., a thermoplastic resin) can be used as the polymer. A transparent polymer is preferred because of employing in an application for use of a transmittable light-scattering sheet (e.g., a liquid crystal display device).

As the polymer, there may be mentioned, for example, cellulose derivatives (e.g., cellulose ethers such as ethylcellulose and cyanoethylcellulose, cellulose esters such as cellulose acetate), acrylic resins, styrenic resins (e.g., polystyrene), polyvinyl-series resins [e.g., poly(vinyl ester) such as poly(vinyl acetate), poly(vinyl halide) such as poly (vinyl chloride), polyvinyl alkyl ethers or polyether-series resins such as poly(vinyl methyl ether), poly(vinyl isobutyl ether) and poly(vinyl t-butyl ether)], polycarbonate-series resins (e.g., aromatic polycarbonates such as bisphenol A-type polycarbonate), polyester-series resins(e.g., homopolyesters, for example, polyalkylene terephthalates such as polyethylene terephthalate and polybutylene terephthalate, polyalkylene naphthalates corresponding to the polyalkylene terephthalates; copolyesters containing an alkylene terephthalate and/or alkylene naphthalate as a main component; homopolymers of lactones such as polycaprolactone), polyamide-series resin (e.g., nylon 6, nylon 66, nylon 610), urethane-series resins (e.g., thermoplastic polyurethane resins), copolymers of monomers forming the above resins [e.g., styrenic copolymers such as methyl methacrylate-styrene copolymer (MS resin), acrylonitrile-styrene copolymer (AS resin), styrene-(meth) acrylic acid copolymer, styrene-maleic anhydride copolymer and styrene-butadiene copolymer, vinyl acetate-vinyl chloride copolymer, vinyl alkyl ether-maleic anhydride copolymer]. Incidentally, the copolymer may be whichever of a random copolymer, a block copolymer, or a graft copolymer.

The styrenic resin includes, for example, a homopolymer such as a polystyrene; styrenic copolymers such as methyl methacrylate-styrene copolymer (MS resin), acrylonitrile-styrene copolymer (AS resin), styrene-(meth)acrylic acid copolymer, styrene-maleic anhydride copolymer and styrene-butadiene copolymer.

The acrylic resin includes, for example, a homo- or copolymer of a (meth)acrylate (e.g., poly($C_{1-4}$alkyl (meth) acrylate) such as poly(methyl methacrylate); a homo- or copolymer of (meth)acrylic acid; polyacrylonitrile.

The glass transition temperature of the polymer can be selected within the range of about −50° C. to 250° C., preferably about 0 to 230° C., and more preferably about 50 to 200° C.

The number-average molecular weight of the polymer is not particularly restricted, but may be for example about 10,000 to 1,000,000, preferably about 10,000 to 500,000, and more preferably about 20,000 to 300,000.

The bicontinuous structure can be composed of a first polymer and a second polymer. The weight ratio of the first polymer to the second polymer may be for example about 20/80 to 80/20, preferably about 30/70 to 70/30, more preferably about 40/60 to 60/40. Incidentally, each of the first polymer and the second polymer may comprise a single polymer or a plurality of polymers.

As the combination of the first polymer and the second polymer, the following combinations may be mentioned by way of example:

The combination of a styrenic resin with an acrylic resin.

The process for forming the bicontinuous structure of the sheet is not particularly limited, and includes, for example, a process comprising molding a composition containing a plurality of polymers which are incompatible with each other among the above polymers (e.g., a composition having a lower critical solution temperature (LCST) type phase separation mode) into a sheet and heating the sheet to a temperature not less than a temperature where a phase separation occurs due to a spinodal separation mechanism (hereinafter, referred to as a spinodal decomposition temperature).

The spinodal decomposition temperature can be suitably selected according to a combination of the polymers, and may be selected, for example, with making reference to a book or a literature about polymer blend. For example, the spinodal decomposition temperatures of a composition containing polystyrene and poly(vinyl methyl ether), a composition containing poly(methyl methacrylate) and styrene-acrylonitrile copolymer and a composition containing poly(methyl methacrylate) and poly(vinyl chloride) are about 120° C., 150° C. and 190° C., respectively ("Chemical Handbook fifth revised edition, the applied chemistry chapter" vol. 2, page 508, published by Maruzen).

Incidentally, the bicontinuous structure is sometimes referred to as a bicontinuous phase structure or as a three-dimensionally continuous or conjugated structure (network structure) and means a structure in which at least two kinds of constituent polymer phases (the first polymer and the second polymer) are continuous. It is sufficient that the sheet of the present invention have at least a bicontinuous structure. Thus, the sheet may have a structure such that a bicontinuous structure and a droplet structure (an independent or isolated phase structure) are intermingled. In the spinodal decomposition, with the progress of phase separation, the polymers form a bicontinuous phase owing to surface tension and on further heating, the bicontinuous phase becomes discontinuous owing to its own surface tension to assume a liquid droplet phase structure (an islands-in-an ocean structure composed of independent beads or spheres). Therefore, according to the degree of phase separation, an intermediate structure between a bicontinuous phase and a droplet phase structure, that is to say a meso-phase structure corresponding to a transition from said bicontinuous phase to said droplet phase can be formed. In the context of the present invention, the above intermediate structure, not the genuine droplet structure (composed of independent or isolated generally spherical phases), is also subsumed in the concept of bicontinuous phase structure. Moreover, the intermediate structure and the bicontinuous structure are sometimes referred to as a spinodal decomposition structure.

The bicontinuous structure usually has a phase separation structure with periodicity, and in the layer having the bicontinuous structure, the period size (interphase distance) may be approximately equal three-dimensionally. That is, an anisotropy is reduced in the layer having a bicontinuous structure and the layer may be substantially isotropic.

Since the period size of the bicontinuous structure becomes larger as the phase separation due to spinodal decomposition proceeds, the period size can be controlled by regulating a heating temperature and a heating time in spinodal decomposition to adjust the rate of the phase separation (the propagation rate of the period size) and the size of the separate phase. For example, as the heating temperature is elevated and/or the heating carried out for many hours, the interphase distance of the sheet increases so that the period size can be controlled.

The heating temperature in spinodal decomposition of the polymeric composition can be selected from higher temperatures than the spinodal decomposition temperature by about 0 to 200° C., preferably about 30 to 170° C. and more preferably about 50 to 150° C. The heating temperature may be about 100 to 300° C., preferably about 150 to 300° C. and more preferably about 200 to 300° C.

Incidentally, the molding method of the sheet is not particularly limited and includes a conventional molding method of a sheet (e.g., extruding method, calendaring method, cast method). For example, a uniform (smooth) and transparent sheet can be obtained by utilizing a solvent-cast method which comprises dissolving the polymeric composition in a solvent (e.g., ester-series solvents such as ethyl acetate, ketone-series solvents such as acetone, halogen-containing solvents such as methylene chloride) and casting.

In the sheet having the fine particulate dispersed structure, a diffused light shows a Gaussian distribution while in the sheet having a bicontinuous structure, a directionality can be imparted to a diffused light so that the diffused light shows a distribution which has a maximum peak according to the directionality. According to the present invention, an intensity of a diffused light can be enhanced over a broad angle range by combining a plurality of layers each having a bicontinuous structure.

That is, the transmittable light-scattering sheet of the present invention comprises a plurality of layers which have a bicontinuous structure and have the different average period size from each other. Incidentally, a plurality of layers are usually laminated. Moreover, the average period sizes in the plural layers may be differ from each other successively or intermittently (e.g., step-wise or gradually) along a direction of thickness of the sheet.

When the period sizes in a plurality of layers differ from each other, not only the directionality can be imparted to the reflected light (reflected and diffused light) but also the maximum or approximately maximum intensity of the reflected light can be maintained over a wide angle range, and the intensity of the diffused light can be enhanced compared to a sheet having a single period size. That is, in the bicontinuous structure (spinodal decomposition structure), it seems that there exists close relationship between a period size and an angle focusing a diffused light. By forming a plurality of bicontinuous structure (spinodal decomposition structure) layers varying in a period size, incident lights on one side of the sheet emerge as diffused lights directed through each layer in different angles according to a period size of each layer, and the directed and diffused lights are composed so that the emerging lights from the sheet are retained with maximum intensity over a broad angle range.

In the transmittable light-scattering sheet of the present invention, the relationship between the period size of each layer and the laminating order is not particularly limited as far as a diffused light is directed at a different angle in each layer but the period size may become larger gradually with a direction of thickness of the sheet. In particular, it is preferred that the first layer is next to the second layer.

When a light-scattering sheet is utilized in a reflecting type liquid crystal display device, the brightness of the liquid crystal screen can be more enhanced as an intensity of a diffused light, an upper limit of a diffusion angle of a diffused light and an angle range focusing a diffused light are larger. Incidentally, when the upper limit of a diffusion angle of a diffused light and the angle range focusing a diffused light are too large, the directionality of a diffused light is deteriorated and the intensity of a diffused light is reduced. Therefore, in the light-scattering sheet of the present invention, the upper limit of a diffusion angle and the diffusion angle range are regulated by adjusting a period size of a spinodal decomposition structure (phase) in a plurality of the above layers. For example, the light-scattering sheet of the present invention may comprise the first layer (sometimes referred to as a standard layer) having such period size as determines an upper limit of a diffusion angle (an angle from a regular reflection) of a reflected light (reflected and diffused light) together with the second layer (sometimes referred to as a directing layer) having such period size as determines an angle range focusing (directing) a diffused light.

The average period size of the spinodal decomposition structure in the standard layer is, for example, about 1.5 to 4 μm, preferably about 1.5 to 3.7 μm, and more preferably about 1.5 to 3.5 μm.

The average period size of the spinodal decomposition structure in directing layer is larger than that of in the standard layer, and the ratio of the period size in directing layer to that in the standard layer may be, for example, the former/the latter=about 1.3/1 to 4/1, preferably about 1.4/1 to 3.5/1, and more preferably about 1.5/1 to 3/1.

The average period size of the directing layer is usually larger than that of the standard layer, for example, by about 0.5 to 8 μm, preferably by about 0.7 to 7 μm, and more preferably by about 1 to 6 μm.

The ratio of thickness of the standard layer to the directing layer is, for example, the standard layer/the directing layer= about 1/1 to 10/1, preferably about 1/1 to 9/1, and more preferably about 2/1 to 8/1.

In the light-scattering sheet of the present invention, the position of the standard layer and the directing layer is not particularly limited but they are usually laminated adjacently. As far as the light-scattering sheet has the standard layer and the directing layer, the sheet may comprise other layers which do not affect adversely the sheet such as an intermediate layer which has an intermediate average period size between the standard layer and the directing layer (e.g., a layer which has the larger period size than that of the standard layer by about 0.1 to 0.4 μm), a layer which has a smaller average period size than that of the standard layer (e.g., a layer which has a smaller average period size of less than 1.5 μm), a layer which has a larger average period size than that of the standard layer (e.g., a layer which has a larger average period size of more than 12 μm), and a non-spinodal decomposition structure layer (e.g., a transparent resin layer).

The forming position of the other layers is not particularly limited. For example, the intermediate layer may be interposed between the standard layer and the directing layer, the layer which has a smaller average period size than that of the standard layer may be laminated on the standard layer, and the layer which has a larger average period size than that of the directing layer may be laminated on the directing layer. The thickness of the other layer may be not more than 50% (e.g., about 1 to 50%) relative to that of the standard layer or the directing layer (in particular, the directing layer).

The thickness of the transmittable light-scattering sheet is, for example, about 3 to 300 μm, preferably about 4 to 100 μm, and more preferably about 5 to 50 μm. When the sheet is too thick, an incident light is multiple-scattered too much in the sheet so that the directionality of the diffused light is deteriorated and the advantage over the Gaussian type diffusing characteristics is lost. While, when the sheet is too thin, an incident light transmits through the sheet without being scattered sufficiently so that the directionality of a diffused light is insufficient.

The haze value of the sheet is, for example, about 20 to 80%, preferably about 20 to 70%, and more preferably about 20 to 65%. When the haze value is too large, an incident light is multiple-scattered too much in the sheet so that the directionality of a diffused light is deteriorated. While when the haze value is too small, an incident light can not be scattered sufficiently so that the directionality of a diffused light is inadequate.

Incidentally, the haze value means to a ratio of quantity of a transmitted light which is diffused at an angle of not less than 40°, to the total quantity of a transmitted light when a light is transmitted from one side of the sheet to the other side. The haze value can be measured by, for example, a hazeometer (manufactured by Nippon Densyoku Kogyo Co. Ltd., NDH-300A).

Incidentally, the light-scattering sheet may be used singly, and if necessary the sheet may be laminated by sticking a substrate sheet or film (a transparent substrate) thereon. The lamination on the transparent substrate can enhance the strength of the sheet.

The production process of the light-scattering sheet of the present invention is not particularly limited, and the sheet can be produced, for example, by a process which comprises laminating a plurality of previously molded sheets (sheets having a bicontinuous structure) varying in the period size, a process which comprises casting a plurality of polymeric compositions varying in rate of phase separation into a layered form to mold a sheet and heating the sheet to a temperature of not less than the spinodal decomposition temperature, a process which comprises molding a polymeric composition into a sheet and heating the sheet with giving a temperature gradient in a direction of thickness of the sheet (i.e., giving a gradient of a phase separation rate) to be subjected to spinodal decomposition (e.g., heating a front side and a back side to a different temperature from each other) and the like. Incidentally, lamination may be carried out, for example, with the use of a conventional adhesive.

When the light-scattering sheet of the present invention is used, the directionality can be imparted to a diffused light, and the intensity of the diffused light can be enhanced over a wide range of angles. The directionality and the intensity of the diffused light can be measured by using a measuring apparatus for a reflection characteristic (manufactured by Chuo Seiki, light source=white light). That is, an intensity of a reflected light against a reflected angle is measured by sticking an aluminum reflector on one side of the light-scattering sheet (a surface of the standard layer side when the sheet comprises the standard layer and the directing layer), and a white light being incident on the other side of the sheet (a surface of the directing layer side when the sheet comprises the standard layer and the directing layer). The white light is incident from a direction inclined by −10° against an axis normal to the sheet. The intensity (GAIN) of a reflected light of the light-scattering sheet is measured as a relative value to an intensity (GAIN=1) of a reflected light of a standard white plate as a standard value. The light-scattering sheet of the present invention (1) may have a peak of the diffuse-reflected light at a diffusion angle of 5 to 10° (for example, an intensity (GAIN) at a maximum peak of a diffused light being about 2 to 10 relative to a intensity of a reflected light of a standard white plate), and (2) may be have a broad area of a diffuse-reflected light at an angle of 10 to 15°.

(1) In case where the sheet has a peak of the diffuse-reflected light at a diffusion angle of 5 to 10°

The peak intensity (GAIN) may be, for example, about 2 to 10, preferably about 2.5 to 10 and more preferably about 3 to 10. Moreover, when the sheet has a peak of the diffuse-reflected light at diffusion angle of 5 to 10°, there usually exists a diffused light having an intensity (GAIN) of about 2 to 10, preferably about 2.3 to 10 and more preferably about 2.5 to 10 at a diffusion angle of 10 to 15°.

(2) In case where the sheet has a broad area of a diffuse-reflected light at an angle of 10 to 15°

An intensity of the diffused light at a diffusion angle of 10 to 15° is maintained with the similar degree in the above range of the diffusion angle. The intensity (GAIN) of the diffused light is, for example, about 1.8 to 10 and preferably about 2 to 10.

The intensity of the diffused light can be enhanced over a broad angle range by using such a light-scattering sheet.

[Liquid Crystal Display Device]

The transmittable light-scattering sheet can form a liquid crystal display device (e.g., a reflecting type liquid crystal display device, a semi-transmittable liquid crystal display device) in combination with a liquid crystal cell. The light-scattering sheet can provide high luminescence of the liquid crystal screen because of its excellent directionality of a diffused light.

As the liquid crystal display device, there may be mentioned a reflecting type or semi-transmittable TN (twisted nematic) liquid crystal display device utilizing two polarizer plates type, a reflecting type or semi-transmittable STN (super twisted nematic) liquid crystal display device utilizing two polarizer plates type, a reflecting type liquid crystal display device utilizing one polarizer plate type (e.g. the mode using one polarizer plate and a twisted nematic liquid crystal, a R-OCB (optically compensated bend) mode, a parallel alignment mode, etc.).

In such a liquid crystal display device, the light-scattering sheet can be disposed to traverse the light path (the path of incidence, the path of reflection, the path of emergence etc.) of the liquid crystal cell having a liquid crystal sealed therein. For example, when a reflecting type liquid crystal display device is formed, the light-scattering sheet can be deposed on the path of incidence of a light in the liquid crystal cell (e.g., on a front surface of the liquid crystal cell), the path of reflection of a light in the liquid crystal cell (e.g., between the liquid crystal cell and the reflector plate) or the like. Moreover, when a semi-transmittable liquid crystal display device is formed, the light-scattering sheet can be disposed on the path of incidence of a light in the liquid crystal cell (e.g., between the liquid crystal cell and a backlight disposed backward the liquid crystal cell), the path of reflection of a light in the liquid crystal cell (e.g., a front surface of the liquid crystal cell) or the like.

In particular, the light-scattering sheet of the present invention can be advantageously used in a color reflecting type liquid crystal display device with a color filter or the like. When a color filter is used, in general, there is possibility that the brightness of the liquid crystal screen is deteriorated, but the brightness of the liquid crystal screen can be improved by the light-scattering sheet of the present invention.

The light-scattering sheet and the liquid crystal display device of the present invention can realize the high brightness of the liquid crystal display screen. Therefore, the light-scattering sheet and the liquid crystal display device of the present invention can be advantageously useful for a reflecting type or semi-transmiting type liquid crystal display device, in particular, a liquid crystal display device of a portable information equipment.

Since the transmittable light-scattering sheet of the present invention has a bicontinuous structure, the directionality can be imparted to a diffused light. In particular, since layers of the bicontinuous structures varying in a period size are laminated in a direction of thickness of the sheet, an intensity of a diffused light can be enhanced at a wide range of angles. Therefore, a liquid crystal display device is formed with the light-scattering sheet so that the liquid crystal screen can be uniformly brightened over whole screen.

EXAMPLES

The following examples are further illustrative of the present invention without defining the scope of the invention.

Incidentally, a period size and a haze value of a sheet obtained by Examples were measured as follows.

[Period Size]

A period size was measured by observing a surface of a sheet and a slice cross section of a sheet with a scanning electron microscope (SEM).

[Haze Value]

A haze value was measured by using a hazeometer (NDH-300A manufactured by Nippon Denshoku Kogyo Co. Ltd.).

Example 1

In 900 parts by weight of ethyl acetate were dissolved 50 parts by weight of poly(methyl methacrylate)(PMMA, "BR-80" available from Mitsubishi Rayon, refractive index=1.49) and 50 parts by weight styrene-acrylonitrile copolymer (SAN, acrylonitrile content=33% by weight, number average molecular weight=30,000, refractive index=1.57), and the mixture was cast on aglass substrate. After drying, a sheet A1 was produced by heating-treatment at 240° C. for 50 seconds (Haze value=42%).

A sheet B1 was produced in a similar manner to that of the sheet A1 except for thinning the sheet on casting and carrying out the heating-treatment at 240° C. for 150 seconds (Haze value=9%).

The sheets A1 and B1 each was peeled from the glass substrate, the surface of each sheet was observed with SEM and each has a bicontinuous structure characteristic of a spinodal decomposition. An average period size of the bicontinuous structure of the sheet A1 is 2.3 $\mu$m and an average period size of the bicontinuous structure of the sheet B1 is 4.8 $\mu$m.

A transmittable light-scattering sheet was prepared by laminating the sheets A1 and B1 (the thickness of the light-scattering sheet=14 $\mu$m, the ratio of thickness of the sheets A1 and B1 (A1/B1)=5/1, haze value=49%) with the use of an adhesive.

Comparative Example 1

A sheet A2 (transmittable light-scattering sheet) was produced in a similar manner to the sheet A1 of Example 1 except for thickening the sheet on casting. The surface of the sheet was observed with SEM and the sheet has a bicontinuous structure characteristic of a spinodal decomposition. The average period size was the same as the sheet A1 of Example 1 (2.3 $\mu$m). Moreover, a haze value was 48%.

An aluminum reflector was stuck on a back side (a surface of the sheet A) of the transmittable light-scattering sheet of Example 1 or Comparative Example 1, and an intensity (GAIN) of a diffuse-reflected light at an angle (a diffusion angle) from a regular reflected light (a light emerged in a direction inclined by 10° from an axis normal to the sheet) was measured with a measuring apparatus for a reflecting characteristic (Chuo Seiki Co. Ltd. light source=white light) by being incident of light in a direction inclined by −10° from a direction of an axis normal to the transmittable light-scattering sheet of the present invention.

The results are shown in FIG. 1.

As apparent from FIG. 1, since the sheet of Comparative Example 1 has a bicontinuous structure having a single period size, an angle range in which a diffused light is directed (concentrated) is narrow. On the other hand, since in the sheet of Example 1, two layers varying in the period size of a bicontinuous structure were laminated, a reflected light can be diffused with an intensity close to a maximum peak over a wide angle range.

Examples 2 to 3

A variety of sheets A and B was produced in a similar manner to Example 1 except for changing the thickness of the sheet on casting and the time of heating-treatment. The light-scattering sheet was produced by laminating the sheets A and B. The sheets A and B used in Examples are shown as below.

Example 2

Sheet A3: the average period size of the bicontinuous structure 2.1 µm, haze value 30%

Sheet B2: the average period size of the bicontinuous structure 4.8 µm, haze value 5%

Light-scattering sheet (sheet A3+sheet B2): haze value 36%, thickness of the sheet 10 µm, ratio of thickness of sheet A3 to sheet B2 (A3/B2)=5/1

Example 3

Sheet A3: the average period size of the bicontinuous structure 2.1 µm, haze value 30%

Sheet B3: the average period size of the bicontinuous structure 3.5 µm, haze value 6%

Light-scattering sheet (sheet A3+sheet B3): haze value 38%, thickness of the sheet 10 µm, ratio of thickness of sheet A3 to sheet B3 (A3/B3)=6/1

The intensity of a diffused light of the light-scattering sheet in Examples 2 to 3 was measured in a similar manner to Example 1.

Figure 2:
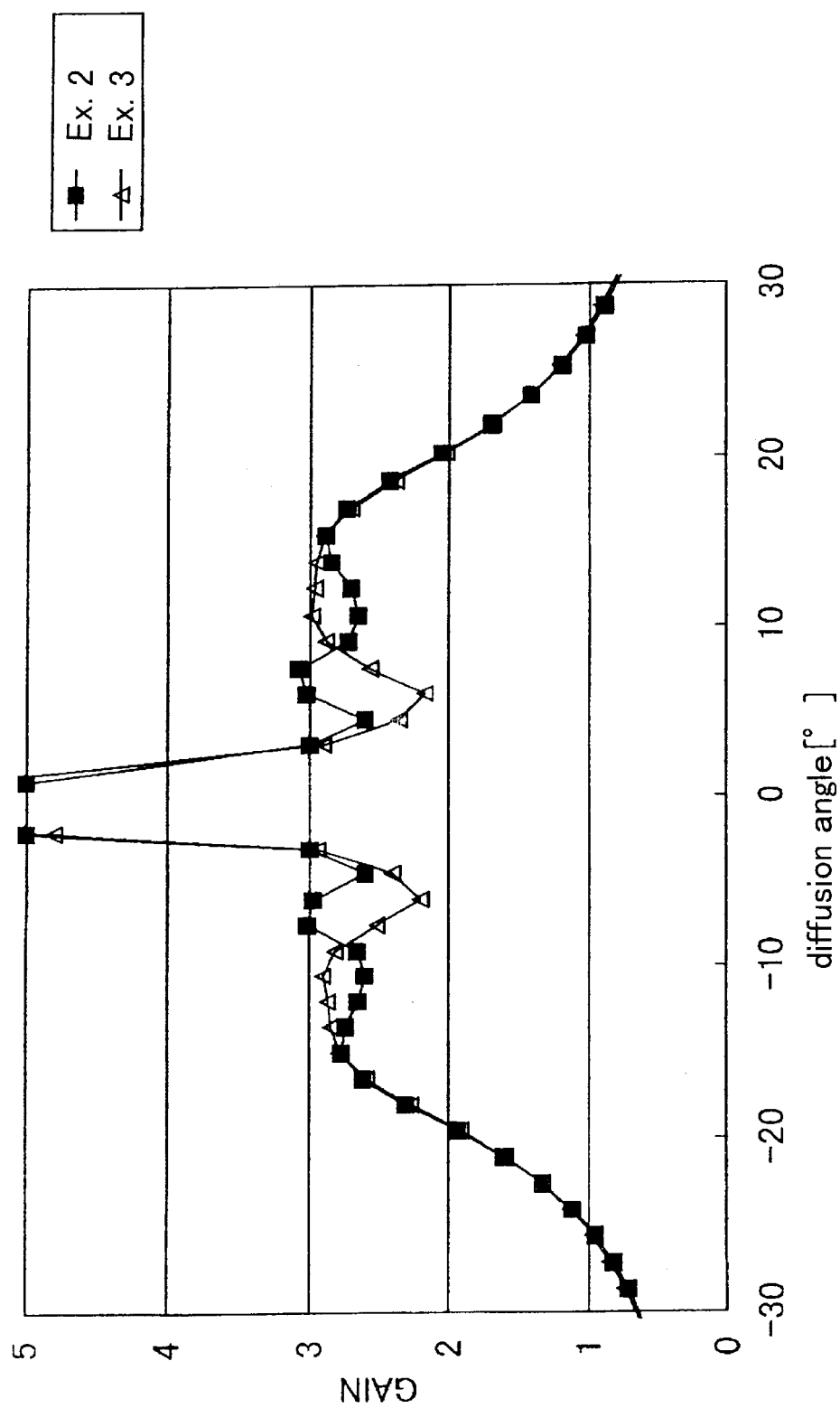
FIG. 2 is a graph showing the relationship between a diffusion angle and an intensity of a diffused light in the sheets of Examples 2 to 3.

The results are shown in FIG. 2.

As apparent from FIG. 2, the larger the difference in the period size between the sheets A and B is, the reflected light can be directed with an intensity closer to a maximum peak over a wide range of angles.

Example 4

The sheet was produced in a similar manner to Examples 2 to 3. The sheets A and B used in Example 4 are shown as follows.

Sheet A4: the average period size of the bicontinuous structure 1.8 µm, haze value 30%

Sheet B5: the average period size of the bicontinuous structure 3.5 µm, haze value 5%

Light-scattering sheet (sheet A4+sheet B5): haze value 33%, thickness of the sheet 15 µm, ratio of thickness of sheet A4 to sheet B5 (A4/B5)=5/1

The intensity of a diffused light of the light-scattering sheet in Example 4 was measured.

Figure 3:
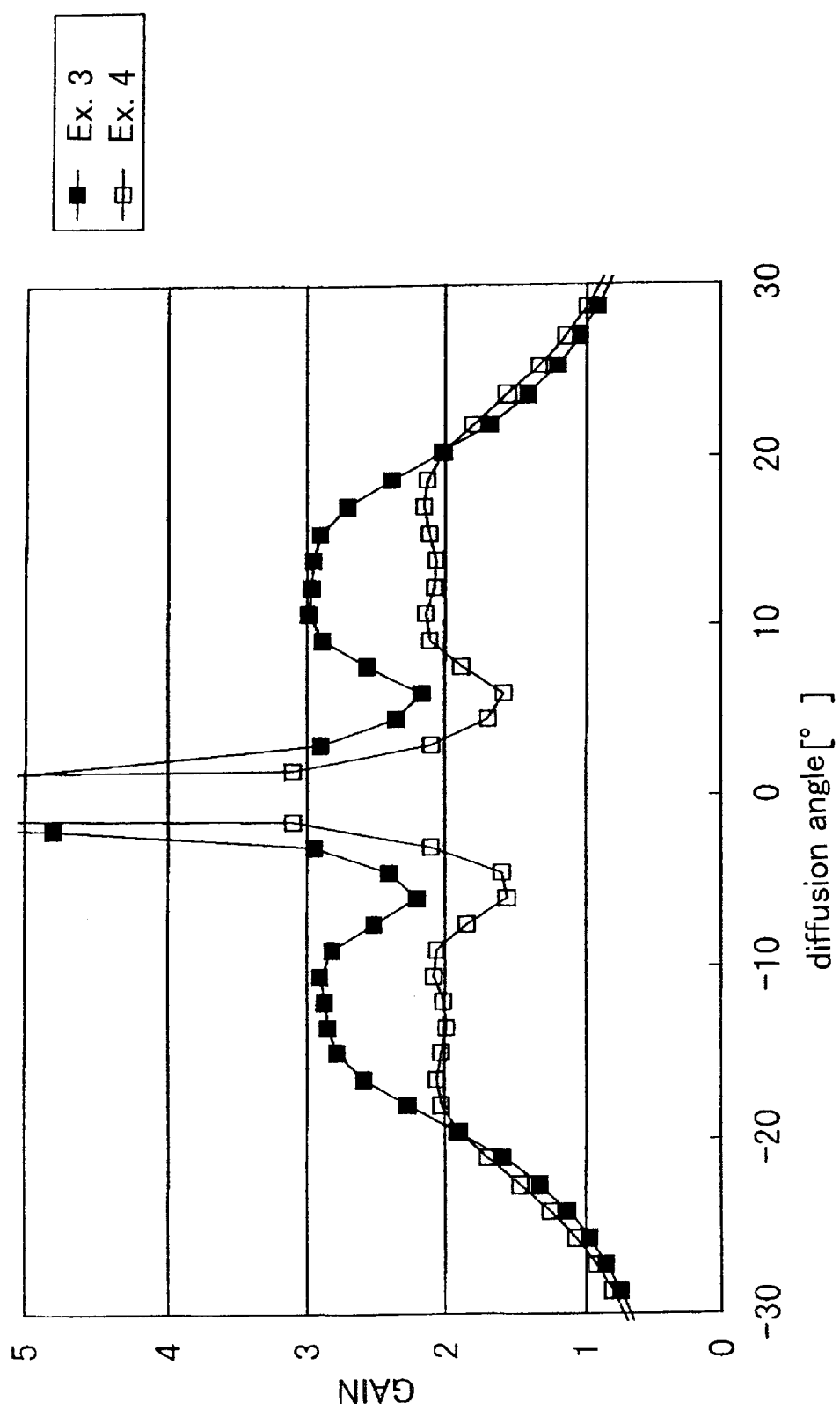
FIG. 3 is a graph showing the relationship between a diffusion angle and an intensity of a diffused light in the sheets of Examples 3 to 4.

The results are shown in FIG. 3 together with that of Example 3.

As apparent from FIG. 3, the larger the period size of the sheet A is, an intensity of the diffused light can be more enhanced, the upper limit can be more extended, a maximum intensity can be retained over a wide angle range.

Examples 5 to 8

The sheet was produced in a similar manner to Examples 2 to 3. The sheets A and B used in each Example were as follows.

Example 5

Sheet A7: the average period size of the bicontinuous structure 3.1 µm, haze value 20%, thickness of the sheet 5 µm Sheet B8: the average period size of the bicontinuous structure 6.3 µm, haze value 7%, thickness of the sheet 2

Light-scattering sheet (sheet A7+sheet B8): haze value 25%, thickness of the sheet 7 µm, ratio of thickness of sheet A7 to sheet B8 (A7/B8)=2.5/1

Example 6

Sheet A8: the average period size of the bicontinuous structure 3.1 µm, haze value 32%, thickness of the sheet 7 µm Sheet B8: the average period size of the bicontinuous structure 6.3 µm, haze value 7%, thickness of the sheet 2 µm Light-scattering sheet (sheet A8+sheet B8): haze value 38%, thickness of the sheet 9 µm, ratio of thickness of sheet A8 to sheet B8 (A8/B8)=3.5/1

Example 7

Sheet A9: the average period size of the bicontinuous structure 3.1 µm, haze value 48%, thickness of the sheet 9 µm Sheet B8: the average period size of the bicontinuous structure 6.3 µm haze value 7%, thickness of the sheet 2 µm Light-scattering sheet (sheet A9+sheet B8): haze value 54%, thickness of the sheet 11 µm, ratio of thickness of sheet A9 to sheet B8 (A9/B8)=4.5/1

Example 8

Sheet A10: the average period size of the bicontinuous structure 3.1 µm, haze value 60%, thickness of the sheet 12 µm Sheet B8: the average period size of the bicontinuous structure 6.3 µm, haze value 7%, thickness of the sheet 2 µm Light-scattering sheet (sheet A10+sheet B8): haze value 63%, thickness of the sheet 14 µm, ratio of thickness of sheet A10 to sheet B8 (A10/B8)=6/1

The intensity of a diffused light of the light-scattering sheet in Examples 5 to 8 was measured in a similar manner to Example 1.

Figure 4:
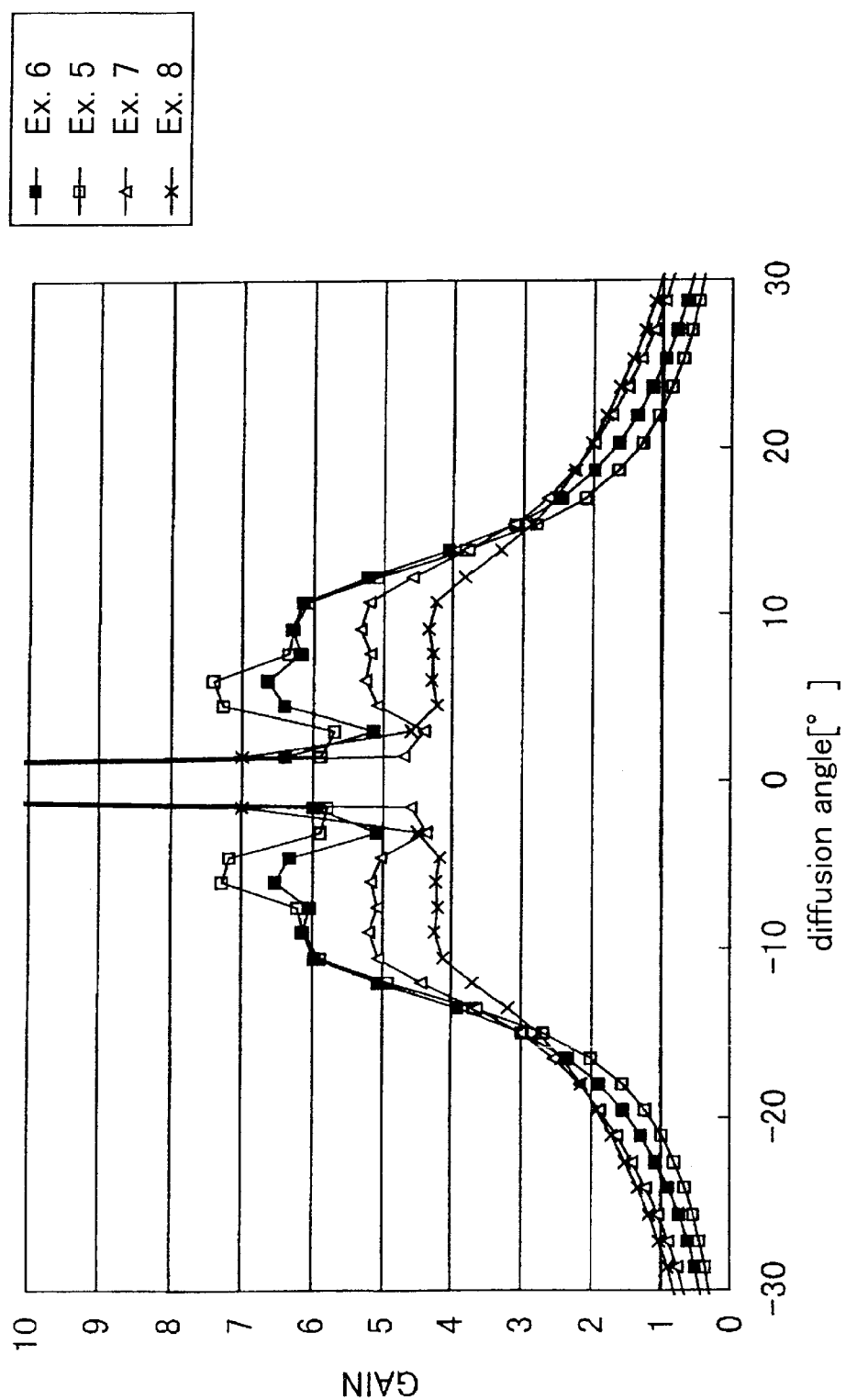
FIG. 4 is a graph showing the relationship between a diffusion angle and an intensity of a diffused light in the sheets of Examples 5 to 8.

The results are shown in FIG. 4.

As apparent from FIG. 4, in the light-scattering sheets of Examples, the intensity of a diffused light can be enhanced over a wide angel range.

What is claimed is:

1. A light-transmittable light-scattering sheet comprising a first layer and a second layer, each having a bicontinuous structure composed of a plurality of polymers varying in refractive index, said bicontinuous structure formed by spinodal decomposition of a composition containing said plurality of polymers, wherein the layers differ from each other in average period size of the bicontinuous structure, and the ratio of the period size of the first layer to that of the second layer is the first layer/the second layer=1.3/1 to 4/1.

2. A light transmittable light-scattering sheet according to claim 1, which comprises at least a first layer having the average period size of the bicontinuous structure of 1.5 to 4 μm, and a second layer having the larger average period size of the bicontinuous structure than that of the first layer by 0.5 to 8 μm.

3. A light tansmittable light-scattering sheet according to claim 1, the first layer is next to the second layer.

4. A light transmittable light-scattering sheet according to claim 1, wherein the ratio of the thickness of the first layer to that of the second layer is the first layer/the second layer=1/1 to 10/1.

5. A light transmittable light-scattering sheet according to claim 1, wherein the thickness of the sheet is 3 to 300 μm.

6. A light transmittable light-scattering sheet according to claim 1, wherein the haze value of the sheet is 20 to 80%.

7. A light transmittable light-scattering sheet according to claim 1, which comprises a first layer and a second layer, each having a bicontinuous structure, wherein when a reflector is disposed on the first layer side and a light is incident on the second layer side, the sheet has the following characteristic (1) or (2) in the relationship between a reflected light which is reflected by the reflector and diffused on the sheet, and a diffusion angle:

(1) the sheet has a peak of the reflected light at a diffusion angle of 5 to 10°, or (2) the sheet has a broad area of the reflected light over a diffusion angle of 10 to 15°.

8. A light transmittable light-scattering sheet according to claim 1, wherein a plurality of polymers constituting the bicontinuous structure comprises a styrenic resin and an acrylic resin.

9. A light transmittable light-scattering sheet according to claim 1, the bicontinuous structure has a phase separation structure of a plurality of polymers.

10. A transmittable light-scattering sheet according to claim 1, which comprises a first layer and a second layer each having a bicontinuous structure, wherein the ratio of the average interphase distance of the first layer to that of the second layer is the first layer/the second layer=1.4/1 to 3.5/1, the first layer has the average interphase distance of 1.5 to 3.7 μm, and a second layer has the larger average interphase distance than that of the first layer by 0.7 to 7 μm, and the ratio of the thickness of the first layer to that of the second layer is the first layer/the second layer=1/1 to 9/1.

11. A liquid crystal display device wherein the sheet recited in claim 1 is disposed on light path of the liquid crystal cell.

12. A process for producing the light transmittable light-scattering sheet recited in claim 1, which comprises laminating a plurality of previously molded sheets varying in an average period size.

* * * * *